Aug. 28, 1956  J. F. TATUM  2,760,663
AUTOMATIC HOLD DOWN STRUCTURE FOR FORK LIFT TRUCKS
Filed Dec. 22, 1953  2 Sheets-Sheet 1
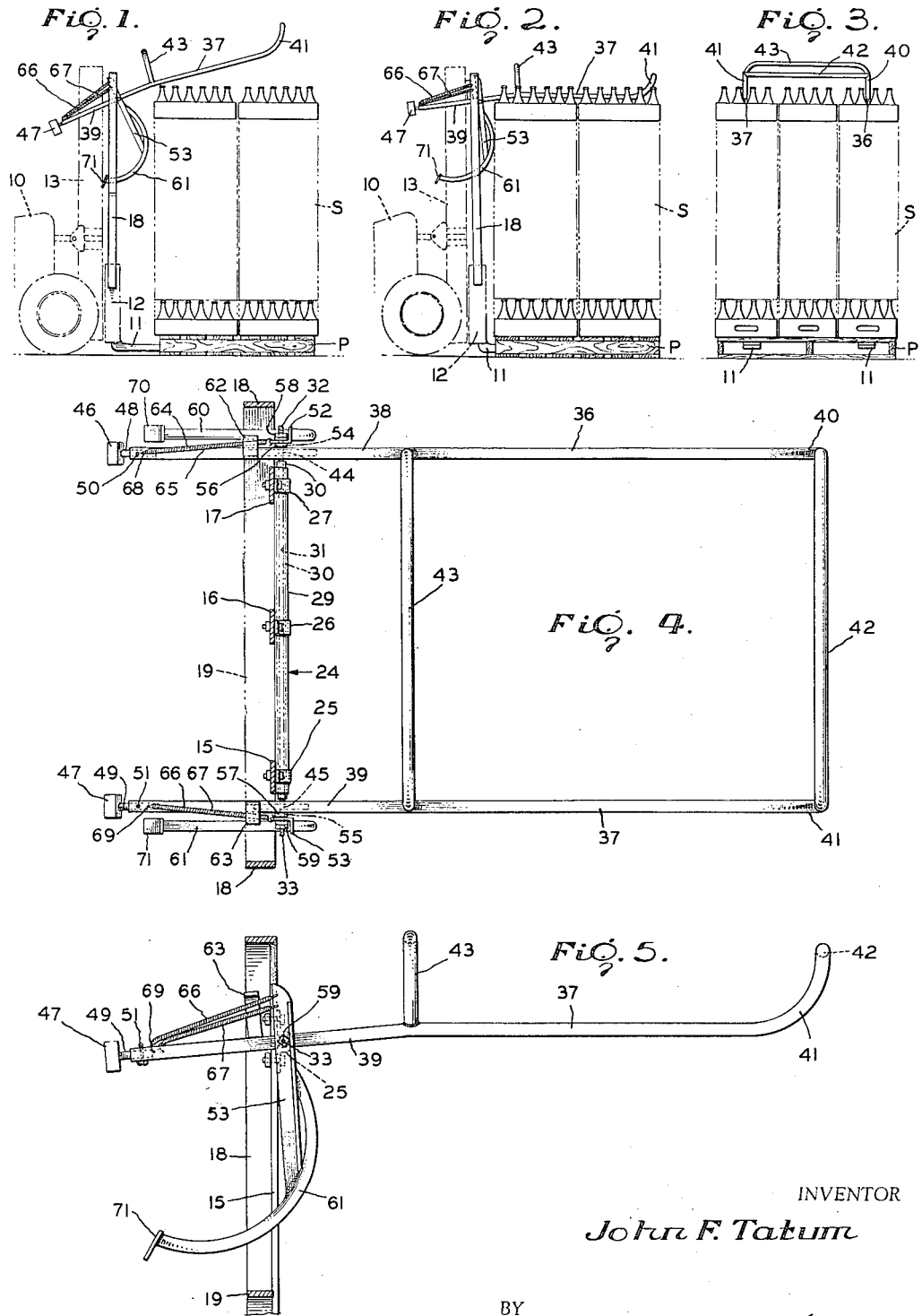
INVENTOR
John F. Tatum
BY Cameron, Kerkam & Sutton
ATTORNEYS Aug. 28, 1956　　　　J. F. TATUM　　　　2,760,663
AUTOMATIC HOLD DOWN STRUCTURE FOR FORK LIFT TRUCKS
Filed Dec. 22, 1953　　　　　　　　　　　　2 Sheets-Sheet 2
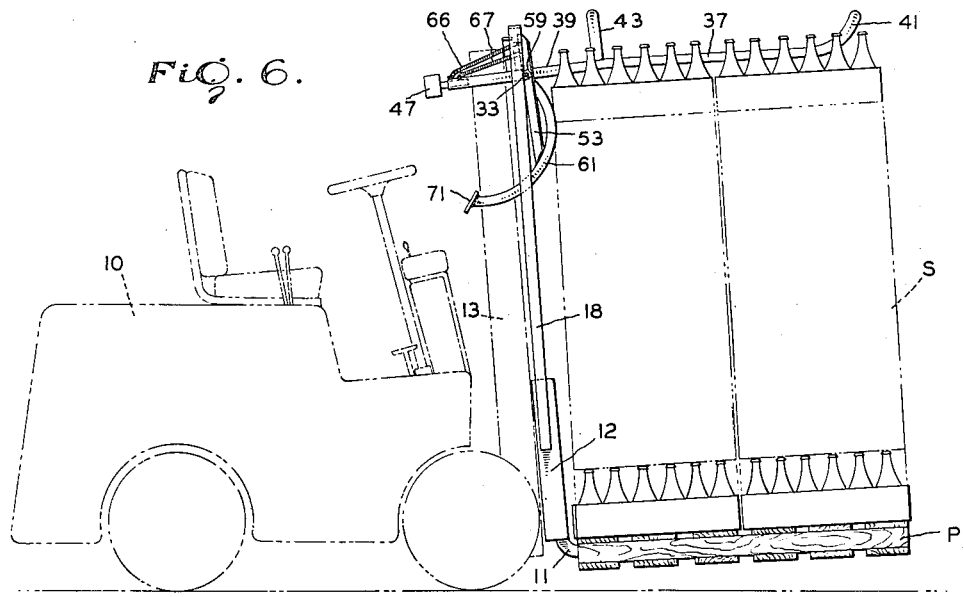
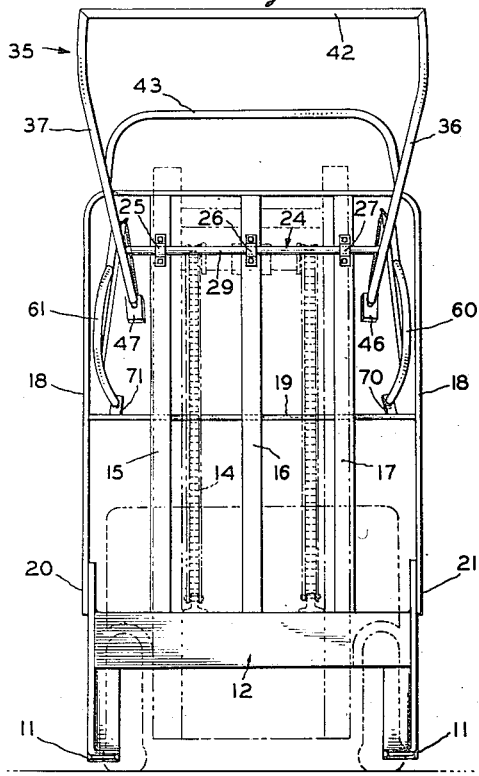
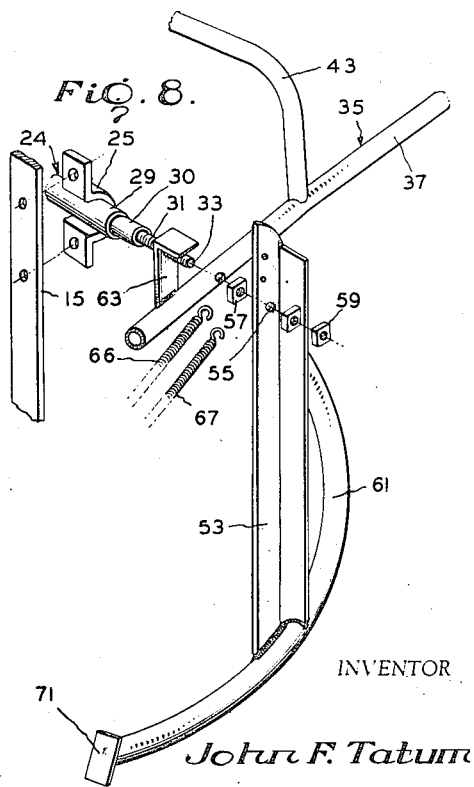
INVENTOR
John F. Tatum
BY Cameron, Kerkam & Sutton
ATTORNEYS United States Patent Office
2,760,663
Patented Aug. 28, 1956

2,760,663

AUTOMATIC HOLD DOWN STRUCTURE FOR FORK LIFT TRUCKS

John F. Tatum, Fort Myers, Fla.

Application December 22, 1953, Serial No. 399,663

7 Claims. (Cl. 214—654)

This invention relates to an improved automatic hold down or locking structure for fork type lift trucks, designed to support loads of goods carried by the forks of the truck. The improved hold down structure is designed for attachment to any conventional fork type lift truck and provides an improved support for stacked goods when the pallet beneath them is engaged and raised as by the base fork of the truck. In the past, particularly in the lifting and transporting of pallets loaded with a stack of bottled case goods, considerable difficulty has been experienced in transport and turning due to the tendency of the stacked case goods to overbalance and topple off the raised pallet. The present improved hold down structure is designed to provide a support for the upper extremity of the load supported on the forks of the truck to prevent sliding or falling of the load during transit.

The invention comprises broadly the provision of auxiliary uprights or standards affixed to the upper extremities of the raisable fork section of the lift truck, to the upper extremities of which are pivotally attached a pair of horizontally disposed elongate arms designed to engage the upper surface of the load supported by the forks of the truck as the forks are moved under the pallet supporting the stacked goods. The provision of these pivoted arms at the upper extremities of the extensions of the fork frame of the truck provides sufficient support for the upper portion of the load to obviate tipping or spilling of the load during transport on the forks of the truck.

It is therefore one object of this invention to provide improved means on a fork lift truck to support or hold down the upper surface of a load transported on the forks of the truck to prevent sliding and displacement thereof.

It is another object of this invention to provide such an improved load supporting structure which will automatically be brought into operation when the forks of the truck are moved under the pallet supporting the base of the load.

It is a further object of this invention to provide such a supporting structure which will be automatically released from engagement with the upper surface of the load when the pallet bearing the load is lowered into contact with the ground and the truck is moved away therefrom.

It is another object of this invention to provide such a load supporting means which will readily accommodate itself to various types of loads.

Other and further objects of this invention will become apparent as this specification proceeds.

Referring to the drawings, Fig. 1 is a side view, partially in phantom, of a lift truck provided with the novel load supporting structure as it moves into position adjacent a load of case goods arranged upon a pallet;

Fig. 2 is a side view of the improved structure with the fork of the lift truck completely inserted beneath the pallet and with the load engaging arms moved downwardly into engagement with the upper surface of the load upon the pallet.

Fig. 3 is a front view showing the fork of the lift truck engaged under the lateral extremities of the pallet and the improved hold down structure in position over the upper surface of the load;

Fig. 4 is a top view, partially in section, of the improved hold down structure;

Fig. 5 is a side view, partially in section, of the improved hold down structure in horizontal position;

Fig. 6 is a side view, partially in phantom, of a lift truck provided with the improved hold down structure, with the fork of the truck in raised position, the pallet and load being raised above the surface of the ground for transport and with the improved hold down structure in position over the upper surface of the load to maintain the load in stable position during transport;

Fig. 7 is a front view, partially in phantom, of a fork lift truck provided with the improved hold down structure, the arms of the hold down structure being in raised or free position; and Fig. 8 is a fragmentary detail view, partially in section and exploded, of the axle assembly and pivotal support means for the hold down structure.

In the drawings, 10 indicates a conventional commercial lift truck of the fork type, provided at its forward lower extremity with lift forks 11 which are carried by and extend outwardly from the lower extremity of a sliding fork base 12 which is slidable upon truck standards 13 which extend upwardly in a substantially vertical plane at the forward extremity of the lift truck 10. Forks 11 and fork base 12 are raisable and lowerable on standards 13 by means of a conventional chain drive mechanism 14, as shown in Fig. 7 of the drawings. The basic lift truck structure is conventional. The truck may be of the Clark or of any other well known fork type.

Referring to Fig. 7 of the drawings, the improved hold down structure is supported upon vertically disposed standards or uprights 15, 16 and 17 which are suitably affixed as by bolting to the upper extremities of the fork base 12 and extend upwardly therefrom to a height substantially equal to the height of the main standards 13 of the lift truck. Standards 15, 16 and 17 preferably lie in a plane parallel to the plane of truck standards 13 and are spaced outwardly therefrom.

Standards 15, 16 and 17 are supported on fork base 12 at their lateral and upper extremities by outer brace member 18 and central brace bar 19. Outer brace 18 is preferably of an inverted U-shape, as shown, and is suitably affixed at its lower extremities 20 and 21 to the upper, outer extremities of fork base 12. Brace 18 extends upwardly from fork base 12 over the upper extremities of standards 15, 16 and 17 and downwardly to affix at its opposite lower extremity to the opposite upper extremity of fork base 12. Brace bar 19 is provided centrally of outer brace 18 and is affixed between the central lateral walls thereof, standards 15, 16 and 17 being suitably affixed thereto, as by bolting or welding, at their centers. It will thus be seen that standards 15, 16 and 17 and their supporting frame structure 18 and 19 are movable vertically with fork base 12, to which they are affixed. Standards 15, 16 and 17 and support frame 18 may be adjustably mounted on fork base 12, as by slotting their lower extremities, to make the hold down structure vertically adjustable.

Supported in a horizontal position across the forward upper extremities of standards 15, 16 and 17 is supporting axle assembly 24 of the improved hold down structure. Axle assembly 24 is affixed across the upper extremities of standards 15, 16 and 17 by means of hasps 25, 26 and 27 which are appropriately bolted or otherwise affixed thereto over axle assembly 24. Axle assembly 24 extends outwardly beyond lateral standards 15 and 17 an appreciable distance. Referring to the detailed drawing shown in Fig. 8, it will be seen that axle assembly 24 comprises outer cylindrical housing 29 and inner cylindrical housing 30 in which rotates axle 31. Axle 31 extends laterally beyond the extremities of housings 29 and 30 and is preferably screw threaded at its outer extremities 32 and 33.

Hold down member 35 is appropriately pivotally mounted adjacent its rearward extremities on axle 31 and will now be described in detail. Hold down member 35 is preferably formed of pipe or cylindrical tubing and as shown comprises paired parallel arms 36 and 37 which are inclined downwardly at an angle of approximately 10° at their rearward extremities 38 and 39 and are curved upwardly in a sharp curve at their forward extremities 40 and 41. Curved forward extremities 40 and 41 are joined by lateral brace member 42 which is welded or otherwise affixed there across. Curved brace member 43 is provided extending upwardly from and between arms 36 and 37 toward their rearward extremities at the points where rear sections 38 and 39 angle downwardly. Curved brace 43 extends upwardly above arms 36 and 37 an appreciable distance and provides medial bracing therefor.

Sections 38 and 39 of arms 36 and 37 are horizontally bored at 44 and 45 to allow passage therethrough of the extremities of axle 31, upon which the entire hold down structure is pivotaly mounted. The rear extremities 38 and 39 of arms 36 and 37 are inclined downwardly from brace 43 for a purpose to be discussed in more detail.

Counterweights 46 and 47 are provided at the extremities of angular sections 38 and 39 to assist in maintaining the hold down structure at an angle of approximately 20° above the horizontal, when disengaged, as will hereinafter be discussed in more detail. Counterweights 46 and 47 preferably are provided with cylindrical studs 48 and 49 which are inserted into the hollow extremities of arm sections 38 and 39 and maintained therein by bolts or cotter pins 50 and 51, the extremities of arm sections 38 and 39 and studs 48 and 49 being appropriately bored to receive pins 50 and 51. Studs 48 and 49 may be provided with a series of lateral bores to permit adjustment of counterweights 46 and 47 to desired position.

Angle arms 52 and 53 are provided outwardly of the central portions of sections 38 and 39 and are appropriately bored adjacent their upper extremities at 54 and 55 to allow pasage of the extremities of axle 31 in such fashion that they are angularly movable with respect to axle 31. Angle arms 52 and 53 are preferably spaced from the outer edges of arm sections 38 and 39 by washers 56 and 57 to maintain them in proper spaced position with respect to sections 38 and 39. Appropriate nuts 58 and 59 are provided over the threaded extremities of axle 31 to maintain the entire assembly in proper position on axle 31.

Angle arms 52 and 53, as shown, extend upwardly above axle 31 and extend downwardly therebelow to a distance of approximately three times their upward extent. Curved trigger members or buffers 60 and 61, preferably formed of tubing, are appropriately welded or otherwise affixed to angle arms 52 and 53, extending from the upper fore portions thereof downwardly about the lower extremities thereof in a smooth curve below and behind angle arms 52 and 53. Buffers 60 and 61 are provided at their lower extremities with angular shoes 70 and 71 designed to contact brace bar 19 when buffers 60 and 61 swing forwardly.

Rectangular stops 62 and 63 are provided extending upwardly and outwardly above arm sections 38 and 39, rearwardly of the axle 31. The upper extremities of stops 62 and 63 are disposed at right angles thereto and extend outwardly a sufficient distance to contact the upper extremities of angle arms 52 and 53 when these extremities are moved rearwardly with respect thereto.

Paired springs 64—65 and 66—67 are provided extending between the bored upper extremities of angle arms 52 and 53 and appropriate holes 68 and 69 in the upper terminal extremities of sections 38 and 39 of arms 36 and 37. Springs 64—65 and 66—67 are preferably provided with hooks at their terminal extremities registering with the holes in angle arms 52 and 53 and in arm extremities 38 and 39. These springs are preferably of considerable strength and tend to pull angle arms 52 and 53 and their depending curved buffers 60 and 61 forwardly about axle 31 as counterweights 46 and 47 pull arms 36 and 37 upwardly on axle 31. They are provided to give flexibility to the hold down structure and to maintain buffers 60 and 61 in proper operative position, as will be discussed hereinafter at more length.

The entire structure is so designed that when pressure is applied against the forward surfaces of curved buffers 60 and 61 springs 64—65 and 66—67 will be extended, which tends to raise rearward extremities 38 and 39 of arms 36 and 37 and counterweights 46 and 47 upwardly while forcing the forward extremities of arms 36 and 37 downwardly toward horizontal position.

The hold down structure operates as follows, when applied to a conventional fork type lift truck. With the case goods or other load appropriately arranged in stack S on a conventional pallet P, the lift truck 10 is moved toward stack S and pallet P, fork 11 of the lift truck being slid under the upper surface of pallet P. The stack S of case goods or other material thus comes into contact with the forward surfaces of curved buffers 60 and 61, forcing buffers 60 and 61 to the rear about axle 31 and forcing the upper extremities of angle arms 52 and 53 forwardly. As buffers 60 and 61 are forced to the rear by pressure of the load on pallet P springs 64—65 and 66—67 are thus increasingly extended by arms 52 and 53, raising counterweights 46 and 47 at the rearward extremities 38 and 39 of arms 36 and 37, forcing arms 36 and 37 downwardly into contact with the stack of goods S on pallet P and providing an increasingly firm downward pressure on the upper surface of the stack S by arms 36 and 37. The hold down structure is designed primarily for loads of cased bottled goods and arms 36 and 37 are designed to fit between the outer rows of bottles, as shown in Figs. 2, 3 and 6.

With the fork 11 of the lift truck completely inserted under the upper surface of pallet P and with curved buffers 60 and 61 in their extreme rearward positions arms 36 and 37 are in their maximum lowered position, firmly seated between the outer rows of bottles which extend upwardly from the top cases of the load on pallet P. With arms 36 and 37 thus in full lowered position to support the load on pallet P and fork 11 the raising mechanism for fork 11 is actuated, as shown in Fig. 6 of the drawings, to raise fork 11, the stabilizing structure and the entire stabilized stack S clear of the surface of the ground, for transport. With the bracing thus provided by arms 36 and 37 sharp turns may be accomplished at a relatively high rate of speed without any possibility of toppling or loss of the load from fork 11.

After the load has been transported to its destination fork 11 is lowered until pallet P rests upon the surface of the ground. The lift truck 10 is then backed away from the load, fork 11 sliding out from underneath the pallet P and curved buffers 60 and 61 being pulled into forward position by springs 64—65 and 66—67 as pressure upon buffers 60 and 61 is relieved. Counterweights 46 and 47 come into action to depress the rearward extremities 38 and 39 of arms 36 and 37, the forward extremities of arms 36 and 37 being raised upwardly clear of the load to free the arms from the upper surface of stack S. It will be noted that curved center brace 43 and curved extremities 40—41 and forward brace 42 are of a sufficient elevation so that they will clear the top of the load when arms 36 and 37 are fully seated between the top rows of bottles in the top cases of the load. The provision of these curved extremities and support members obviates any possibility of fouling arms 36 and 37 in the load which might cause malfunctioning of the hold down structure on moving the truck toward or away from the grounded pallet.

It will be noted that the provision of springs 64—65 and 66—67 between the upper terminal extremities of arms 36 and 37 and the upper bored extremities of angle arms 52 and 53 maintains the hold down structure under spring tension at all times and imparts a flexibility to the structure which is essential to prevent damage to the upper tiers of the load and malfunctioning of the hold down structure. If necessary, the operator of the lift truck may reach forwardly and force counterweights 46 and 47 downwardly against the tension of springs 64—65 and 66—67 properly to align arms 36 and 37 upon presentation thereof to the load. The provision of these springs also assures that at no time will arms 36 and 37 apply too great a positive pressure to the upper surface of the load as might occur were there a rigid connection between arm sections 38 and 39 and buffer members 60 and 61.

Arms 36 and 37 are freely and pivotally movable about axle 31 as are angle arms 52 and 53 and buffers 60 and 61. Springs 64—65 and 66—67 provide a flexible connection between the buffers 60 and 61 and arms 36 and 37 to assure proper functioning of the hold down structure at all times. Further, by virtue of this novel combination of elements, as soon as pallet P is lowered to the ground and movement of the truck away from the stack S initiated buffers 60 and 61 swing forwardly and arms 36 and 37 are instantly moved upwardly out of contact with the upper surface of stack S, completely freeing arms 36 and 37 therefrom.

The rear extremities 38 and 39 of arms 36 and 37 are inclined downwardly from the forward extremities of the arms at an angle of approxiamtely 10° to assure a proper horizontal positioning of arms 36 and 37 over the entire length of the load when the arms are in lowered position. Further, this angularity of rear arm sections 38 and 39 reduces the upward inclination of arms 36 and 37 when buffers 60 and 61 are relieved of pressure and are in free, forward position. The angularity of sections 38 and 39 also insures an instantaneous raising of arms 36 and 37 clear of the upper surface of the load as soon as pressure against buffers 60 and 61 is relieved.

Stops 62 and 63 are provided with outwardly extending rectangular contact surfaces which extend outwardly to the planes of angle arms 52 and 53. These stops limit the rearward angular movement of the upper extremities of angle arms 52 and 53 to maintain buffers 60 and 61 in proper operative position when free and to prevent too great a forward movement of buffers 60 and 61. Buffers 60 and 61 are provided with angular shoes 70 and 71 at their lower extremities which impinge against brace bar 19 when buffers 60 and 61 swing forwardly, to limit the forward movement of buffers 60 and 61 and the upward movement of arms 36 and 37. Thus, when the lift truck is backed away from a load and buffer members 60 and 61 are freed and swing forwardly, rearward movement of the upper extremities of angle arms 52 and 53 and forward movement of buffers 60 and 61 will stop when angle arms 52 and 53 contact stops 62 and 63 and when the shoes at the lower extremities of buffers 60 and 61 contact brace bar 19. Thus, proper operative positioning of buffers 60 and 61, when free, is assured and buffers 60 and 61 are always maintained in the proper forward position to contact the next load to be handled.

Arms 36 and 37 are pivotally mounted on axle 31 at the centers of their rear angular extremities 38 and 39. When buffers 60 and 61 are free of pressure the entire arm structure is maintained in proper position on axle 31 by the combination of counterweights 46 and 47, which tend to pull arms 36 and 37 upwardly, and buffers 60 and 61 connected by springs 64—65 and 66—67 to arm extremities 38 and 39, which tend to pull arms 36 and 37 downwardly. In rest arms 36 and 37 are held at an angle of about 20° above the horizontal by the contact of buffer shoes 70 and 71 against brace bar 19. With arms 36 and 37 at an angle of 20° above the horizontal angle arms 52 and 53 are angularly inclined forwardly on axle 31, maintaining buffers 60 and 61 in proper forward position to initiate operation of the hold down structure and allowing sufficient clearance under the rear extremities of arms 36 and 37 for the passage of the upper edge of a load thereunder. Here again, the angularity of rear extremities 38 and 39 is important as it assures the necessary clearance for the passage of arms 36 and 37 completely over the length of the load.

This invention is susceptible of numerous embodiments without departing from the spirit thereof. The configuration and length of arms 36 and 37 may be varied depending upon the type of load to be supoprted. Thus, if the load has a flat upper surface a flat bearing surface may be provided between arms 36 and 37 to register therewith. Should the load have a convex upper surface a corresponding concave bearing surface may be provided between arms 36 and 37. If desired, additional supporting members may be provided between arms 36 and 37.

The means of attachment of the pivoted hold down structure to the fork lift portion of the truck may be varied within a wide range without departing from the spirit of the invention. The standards and braces may be made adjustable to accommodate the structure to loads of widely varying heights.

Equivalents may be substituted in all instances for any element of the combination wtihout departing from the spirit of the invention.

This specification is by way of illustration of one embodiment of the invention only. Attention is directed to the appended claims for a limitation of the scope of this invention.

What is claimed is:

1. In a hold down structure for fork lift trucks uprights affixed to and extending upwardly from the fork section of the lift truck, an anxle mounted across the upper extremities of said uprights, elongate, upwardly curved arms pivotally mounted at their rearward extremities on the extremities of said axle and normally disposed at a slight angle above the horizontal, buffer members indepenently pivotally mounted outwardly of said arms on said axle extending downwardly below said arms, springs connecting the rear extremities of said arms and the upper extremities of said buffer members whereby said arms are flexibly controlled in their arcuate movement about said axle by said springs and said buffer members.

2. In a hold down structure for fork lift trucks uprights affixed to and extending upwardly from the fork section of the lift truck, an axle mounted across the upper extremities of said uprights, elongate arms pivotally mounted at their rearward extremities on the extremities of said axle normally disposed at an acute angle above the horizontal, an upwardly curved brace member disposed centrally of said arms, curved buffer members independently pivotally mounted outwardly of said arms on said axle extending downwardly below said arms, springs connecting the rear extremities of said arms and the upper extremities of said buffer members whereby said arms are flexibly controlled in their arcuate movement about said axle by said springs and said buffer members when said buffer members are contacted by a load on said truck.

3. In a hold down structure for fork lift trucks uprights affixed to and extending upwardly from the fork section of the lift truck, an axle mounted across the upper extremities of said uprights, elongate arms pivotally mounted at their rearward extremities on the extremities of said axle, buffer members pivotally mounted outwardly of said arms on said axle extending downwardly below said arms, stops on said arms adjacent said axle extending outwardly to the planes of the upper extremities of said buffer members, paired coil springs connecting the rear extremities of said arms and the upper extremities of said buffer members whereby said arms are flexibly controlled in their arcuate movement about said axle by said springs and said buffer members.

4. In a hold down structure for fork lift trucks uprights affixed to and extending upwardly from the fork section of the lift truck, a fixed axle mounted horizontally across the upper extremities of said uprights and extending outwardly beyond said uprights, elongate arms pivotally mounted on the extremities of said axle, counterweights disposed at the rear extremities of said arms, downwardly and rearwardly curved buffer members pivotally mounted outwardly of said arms on said axle extending downwardly below said arms, rectangular stops on said arms adjacent said axle, extending outwardly to the planes of said buffer members, resilent means connecting the rear extremities of said arms and the upper extremities of said buffer members whereby said arms are flexibly controlled in their arcuate movement about said axle by said springs and said buffer members.

5. In a hold down structure for fork lift trucks uprights affixed to and extending upwardly from the fork section of the lift truck, an axle mounted across the upper extremities of said uprights, elongate arms inclined downwardly at their rear extremities and curved upwardly at their forward extremities pivotally mounted at their rearward extremities on the extremities of said axle and normally inclined at a slight angle above the horizontal, counterweights disposed at the rear extremities of said arms, buffer members pivotally mounted outwardly of said arms on said axle extending downwardly below said arms, springs connecting the rear extremities of said arms and the upper extremities of said buffer members whereby said arms are flexibly controlled in their arcuate movement about said axle by said springs and said buffer members.

6. In a hold down structure for fork lift trucks uprights affixed to and extending upwardly from the fork section of the lift truck, an axle mounted across the upper extremities of said uprights, arms pivotally mounted at their rearward extremities on the extremities of said axle, slidable counterweights disposed at the rear extremities of said arms, buffer members pivotally mounted outwardly of said arms on said axle extending downwardly below said arms, springs connecting the rear extremities of said arms and the upper extremities of said buffer members whereby said arms are flexibly controlled in their arcuate movement about said axle by said springs and said buffer members.

7. In a hold down structure for fork lift trucks, standards extending upwardly from the fork section of the truck, an axle horizontally mounted across the upper extremity of said standards, elongate arms pivotally mounted on said axle and normally disposed at a slight angle above the horizontal, curved buffer means independently pivotally mounted on said axle outwardly of said arms and resilient means joining the rear extremities of said arms and the upper extremities of said buffer means, whereby the angular movement of said arms is controlled by said buffer means.

References Cited in the file of this patent

UNITED STATES PATENTS

| | | |
|---|---|---|
| 1,900,569 | Lederer | Mar. 7, 1933 |
| 2,424,429 | Bamberg | July 22, 1947 |
| 2,520,564 | Reagle | Aug. 29, 1950 |
| 2,557,395 | Schmidgall | June 19, 1951 |
| 2,578,892 | Heidrick et al. | Dec. 18, 1951 |
| 2,599,855 | Michaux | June 10, 1952 |
| 2,613,829 | Gault | Oct. 14, 1952 |

FOREIGN PATENTS

| | | |
|---|---|---|
| 132,666 | Australia | June 2, 1949 |
| 144,506 | Australia | Dec. 28, 1951 |